M. G. CAMPAU.
CREAM AND MILK TESTING DEVICE.
APPLICATION FILED MAR. 27, 1911.

1,010,016.

Patented Nov. 28, 1911.

UNITED STATES PATENT OFFICE.

MERLE G. CAMPAU, OF OCONTO, NEBRASKA.

CREAM AND MILK TESTING DEVICE.

1,010,016.  Specification of Letters Patent.  Patented Nov. 28, 1911.

Application filed March 27, 1911. Serial No. 617,063.

*To all whom it may concern:*

Be it known that I, MERLE G. CAMPAU, a citizen of the United States, residing at Oconto, in the county of Custer, State of Nebraska, have invented certain new and useful Improvements in Cream and Milk Testing Devices; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a cream and milk testing device adapted for use at milk and cream stations, and consists in the construction and arrangement of parts hereinafter more fully set forth and pointed out in the claims.

The object of the invention is to provide simple and efficient means whereby a plurality of samples of milk or cream may be tested at the same time, or a single sample may be tested in an efficient and economical manner.

The above object is attained by the mechanism illustrated in the accompanying drawings, in which:—

Figure 1:
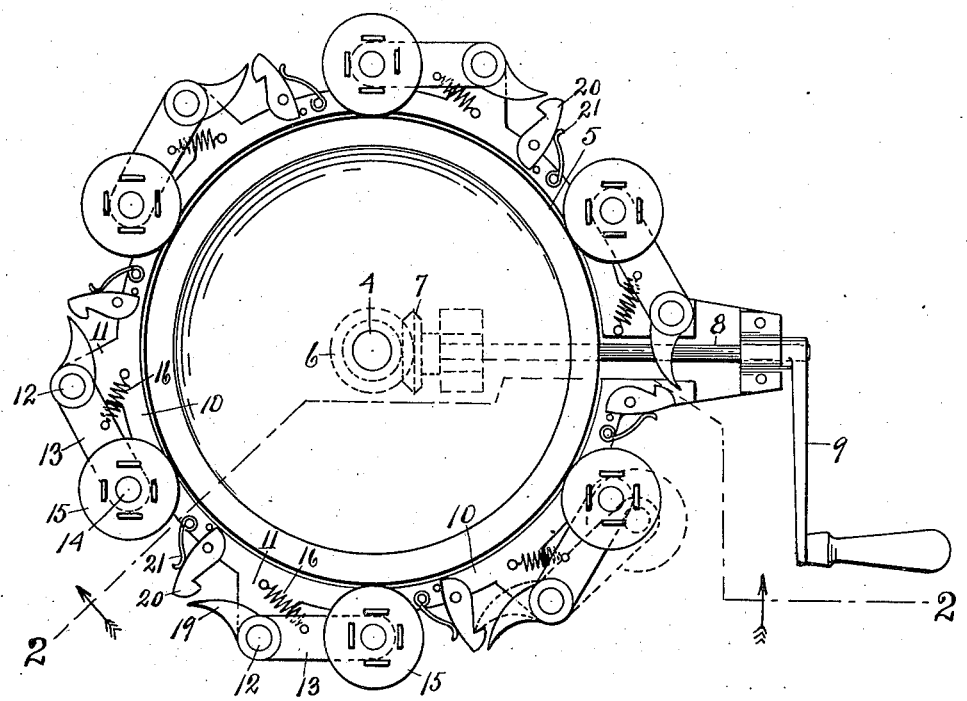
Figure 2:
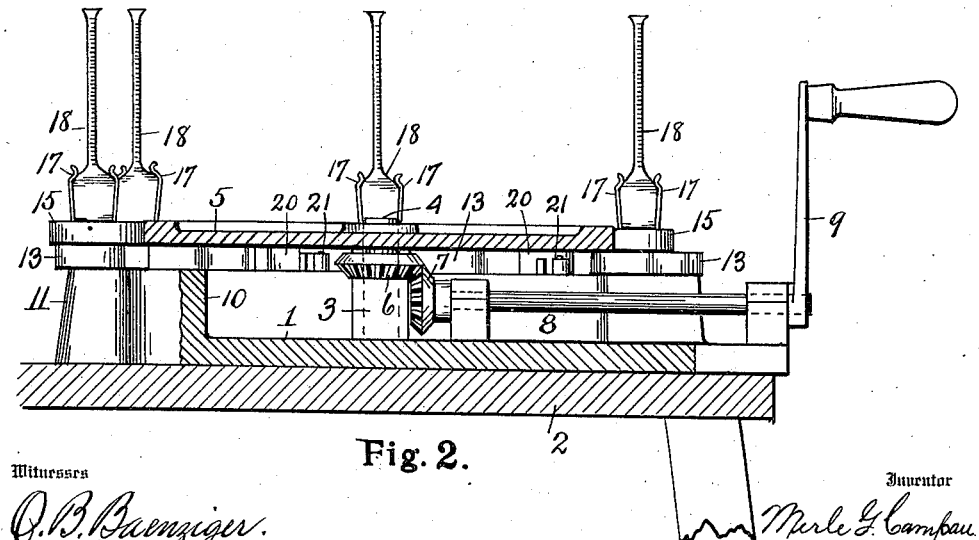

Figure 1 is a plan view of a testing apparatus involving my invention. Fig. 2 is a sectional view, as on line 2—2 of Fig. 1.

Referring to the characters of reference, 1 designates a suitable base plate adapted to be mounted upon a table 2, or other support, and having a central standard 3 in which is journaled a short vertical shaft 4. Fixed to the upper end of said shaft is a large friction wheel 5 lying in a horizontal plane and adapted to turn about a vertical axis. Secured to the shaft 4 below the wheel 5 is a beveled gear 6. Meshing with the gear 6 is a beveled gear 7 secured to the end of a horizontal shaft 8 suitably journaled on the base 1 and carrying the operating crank 9 at its outer end. It will now be evident that by turning the crank 9, the large wheel 5 may be rotated. Mounted upon the margin of the base 1 is a raised circular flange 10 which surrounds the wheel 5. Projecting outwardly from said flange are a plurality of buttresses 11 upon each of which is pivotally mounted at 12 an arm 13 adapted to swing in the arc of a horizontal circle. Carried by each of said arms and journaled at 14 in the outer end thereof is a friction wheel or pinion 15 adapted to roll in peripheral contact with the wheel 5. Connecting each of said arms with the flange 10 is a spring 16 whose tension is normally exerted to hold the pinion 15 in frictional contact with the wheel 5. Each of the wheels or pinions 15 is provided with a bottle-holder comprising upwardly extending spring fingers 17 which are disposed concentric with respect to the axis of rotation of said pinion and are adapted to receive and hold the testing bottles 18 while being rotated for the purpose of making a test of the cream or milk contained therein by centrifugal action, as will be well understood in the art. With the bottles in position in the holders of the pinions 15, by rotating the wheel 5 through the medium of the crank 9, the pinions 15 will be rotated at a high rate of speed, thereby effecting a separation of the butter fat from the milk or cream by centrifugal action. The machine is so constructed as to enable a great many samples to be tested at the same time, if desired.

To enable each of the pinions to be held from operative contact with the driving wheel 5, each of the arms 13 is provided at the pivotal end thereof with a curved extension 19 which extends rearwardly from said arm and swings in the arc of a circle when the arm is swung upon its pivot 12. Standing in the path of travel of each of said curved extensions 19 is a detent 20 backed by a spring 21. By this arrangement when any one of the arms is swung outwardly to carry the pinions 15 thereon from engagement with the driving wheel 5, the curved extension 19 will become engaged by the detent 20 and held in that position until released, whereby any number of the wheels or pinions 15 may be employed at a time, as desired. In case but one sample of milk or cream is to be tested, all of the other wheels or pinions except the one in use, may be thrown out of gear or frictional engagement with the driving wheel, thereby very materially reducing the friction and the wear upon the parts. To release any one of the arms which may have been held in a retracted position by one of the detents, it is only necessary to spring said detent backwardly by pressure against the free end thereof, when the arm in question will be released and its spring 16 will again carry its wheel or pinion 15 into operative engagement with the driving wheel.

Having thus fully set forth my invention, what I claim as new and desire to secure by Letters Patent, is:—

1. A testing device comprising a rotatable driving member, a rotatable driven member operatively engaging said driving member, and a holder for a testing bottle mounted on said driven member concentrically with respect to the axis thereof.

2. A testing device comprising a rotatable driving member, a rotatable driven member operatively engaging said driving member, a holder for a testing bottle mounted on said driven member concentrically with respect to the axis thereof, and means for yieldingly maintaining the driven member in working relation with the driving member.

3. A testing device comprising a rotatable driving member, a rotatable driven member operatively engaging said driving member, a holder for a testing bottle mounted on said driven member concentrically with respect to the axis thereof, means for yieldingly maintaining the driven member in working relation with the driving member, and means for holding the driven member out of working engagement with the driving member.

4. A testing device comprising a driving wheel, means for rotating said driving wheel, a pivotally mounted arm, a pinion rotatively mounted on said arm, means for yieldingly maintaining said pinion in working relation with said driving wheel, means for locking said arm in position to hold said pinion out of engagement with the driving member, and a testing bottle-holder mounted upon and rotatable with said pinion.

5. A testing device comprising a driving wheel, means for rotating said wheel, a plurality of movably mounted pinions, means for holding said pinions independently in working relation with said driving wheel to be driven thereby concurrently, means for independently disengaging each of said pinions from said driving wheel, and a bottle-holder concentrically mounted on and rotatable with each of said pinions.

6. A testing apparatus comprising a driving wheel, means for rotating said wheel, a swinging arm, a pinion journaled on said arm adapted to have working engagement with said wheel, means for holding said pinion yieldingly in working engagement with the driving wheel, means for automatically locking said swinging arm when swung outwardly to carry its pinion free from the driving wheel, and a bottle-holder concentrically mounted on said pinion.

In testimony whereof, I sign this specification in the presence of two witnesses.

MERLE G. CAMPAU.

Witnesses:
WALLER D. EASTMAN,
JAMES KLEIBER.

---

Copies of this patent may be obtained for five cents each, by addressing the "Commissioner of Patents, Washington, D. C."